No. 798,303. PATENTED AUG. 29, 1905.
A. SCHURR, Jr.
NUT HOLDING WRENCH.
APPLICATION FILED MAR. 29, 1905.
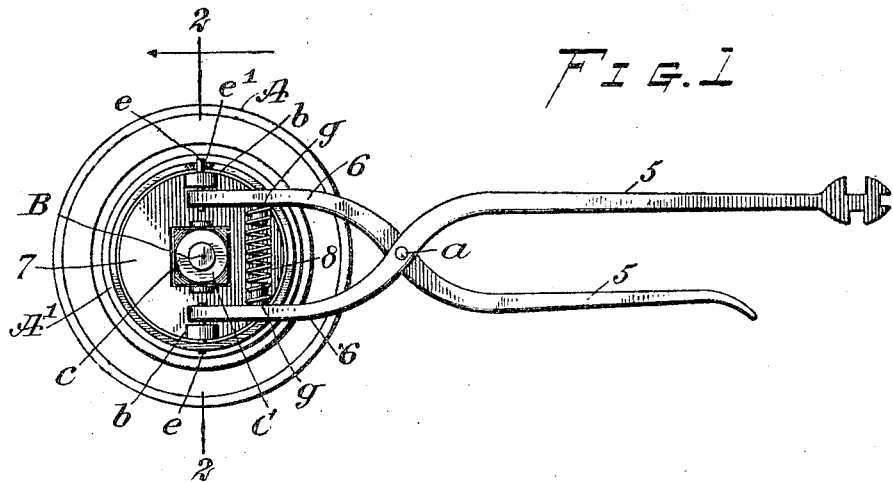
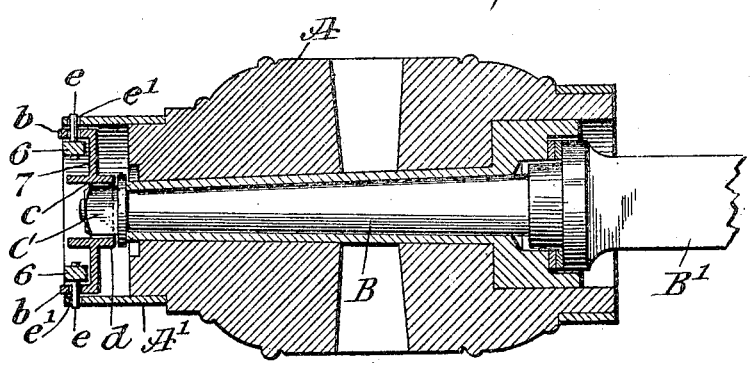
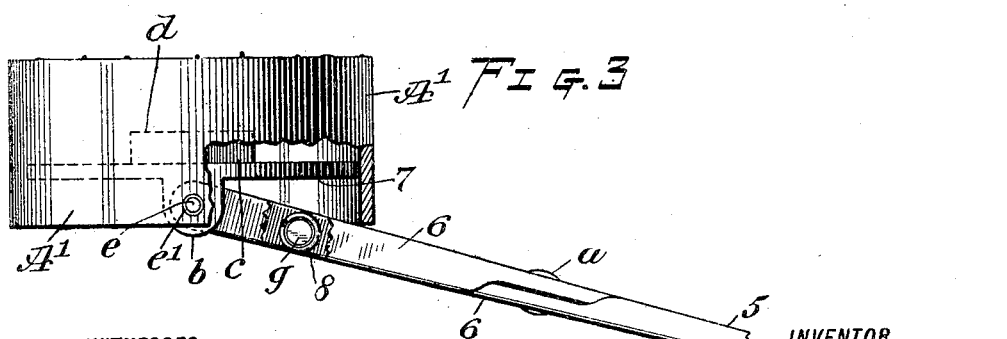
WITNESSES:
John J. Kittle
Wm. P. Patton
INVENTOR
August Schurr Jr.
BY
ATTORNEYS

UNITED STATES PATENT OFFICE.

AUGUST SCHURR, JR., OF LLOYD, MONTANA.

NUT-HOLDING WRENCH.

No. 798,303. Specification of Letters Patent. Patented Aug. 29, 1905.

Application filed March 29, 1905. Serial No. 252,648.

*To all whom it may concern:*

Be it known that I, AUGUST SCHURR, Jr., a citizen of the United States, and a resident of Lloyd, in the county of Chouteau and State of Montana, have invented a new and Improved Nut-Holding Wrench, of which the following is a full, clear, and exact description.

One object of my invention is to provide novel means for unscrewing the nut from an axle-spindle, so that the vehicle-wheel thereon may be removed for a lubrication of the axle-spindle, and also for the replacement of the wheel and nut on the spindle without directly handling the nut, thus avoiding soiling of the hands with the lubricant usually smeared over the nut.

A further object is to provide a wrench of novel construction for holding the nut on a vehicle-axle spindle temporarily secured upon the front collar on the hub of a wheel mounted upon the axle, thus adapting the rotation of the wheel to unscrew the nut from the axle-spindle, and hold the nut centered in the collar for a screwed reëngagement with the threaded end of said spindle after a lubricant has been placed on the body of the spindle, whereby contact of the hands with the greasy nut is avoided.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view of the improved wrench and a front end view of a vehicle-spindle, a wheel-hub thereon, a collar on the front end of the hub, a nut screwed upon the end of the spindle, and means for connecting the collar with a holder-plate carried by the jaw members of the wrench. Fig. 2 is a longitudinal sectional view substantially on the line 2 2 in Fig. 1, and Fig. 3 is an enlarged broken and partly sectional side view of the improved wrench engaged within the front sand band or collar on a vehicle-wheel hub.

The improved wrench or nut-holder is provided with two handle members 5 5, bent edgewise into substantially S shape, thus affording two jaws 6 6 of equal length integral with the handle members. The handle members 5 at their S-bends are lapped together sidewise and pivoted where they lap, as shown at $a$, thus adapting the divergence of the jaws 6 to spread apart the handle members 5 and compression applied upon the members 5 to correspondingly move the jaws toward each other.

A holder-plate 7 is a detail of the invention, comprising a preferably circular disk having two similar flanges $b$, projected outward therefrom at a right angle and opposite each other. Centrally in the disk or holder-plate an angular aperture $c$ is formed, which may be of square or other polygonal form to adapt the aperture to receive the body of a vehicle-nut of corresponding shape. Preferably an integral collar $d$ is formed on the holder-plate 7 around the aperture $c$, affording a stiffening-flange therefor and having a like contour, so that the flanged aperture $c$ may receive a vehicle-spindle nut and loosely embrace it.

At opposite points a perforation is formed in each jaw 6, near the outer end thereof, and in these perforations pins $e$ are secured, which project outwardly a suitable length. The flanges $b$ each have a central perforation, through which a corresponding pin $e$ may be inserted from the inner side of the flange, and the pins have sufficient length to permit them to project somewhat outside of the flanges when engaged therewith. An expanding spring 8 is held in position between the jaws 6, either by an engagement of the ends of the spring with dowel-pins $g$ or other means, and it will be evident that the force of the spring will hold the pins $e$ engaged within the perforations of the flanges $b$ when they have been inserted by compression of the handles 5.

The hub A may represent that portion of a vehicle-wheel of a heavy or light character adapted for rotatable engagement with an axle-spindle B, which is threaded, as usual, at the outer end for the screwed engagement therewith of a nut C. Upon the outer end of the hub A is mounted the ordinary sand-band A′, and to adapt it for service it is secured upon the hub so as to turn with the hub. At diametrically opposite points two perforations are formed in the sand-band A′, preferably near the outer edge thereof, these perforations $e'$ being provided for the reception of the outer end portions of the pins $e$.

In using the implement, assuming that the vehicle-wheel, of which the hub A is a portion, is to be removed from the spindle B and that to permit this the axle B′ has been raised and supported so as to give the wheel clearance, it is only necessary that the nut C be engaged by the apertured holder-plate 7, as already explained, and the handle members 5 manipulated for the insertion of the pins $e$ into the perforations $e'$ in the sand-band A'. This connection of the holder-wrench with the nut C and the sand-band A' may be readily maintained by grasping the handle members 5 with one hand, which will enable the other to be used in turning the wheel and its hub in a direction that will unscrew the nut from the threaded end of the spindle B.

It will be seen that, if desired, the nut C may be held with the novel implement centered in the sand-band A' and the wheel be completely removed from the spindle B for the lubrication of the latter, whereupon the wheel and its hub A may be replaced on the spindle and the nut C be reëngaged with the threaded end of the spindle, so as to screw it thereon, and thus secure the wheel on the spindle. Upon replacing the wheel-hub upon the spindle a compression of the handle members 5 will disengage the pins $e$ from the sand-band A' and detach the implement from the wheel-hub.

It will be noticed in Fig. 3 that the pivotal connection of the pins $e$ with the flanges $b$ permits the jaws and handle members of the nut-holder to incline outward and laterally, thus adapting them together to serve as a lever for the rotation of the hub in case the wheel is dirty, so that the hands need not be soiled in removing from or replacing a wheel on the spindle.

Having thus described my invention, I claim as new and desire to secure by Letters Patent—

1. A nut-holding device, comprising handle members lapped and pivoted together, an apertured holder-plate loosely mounted on corresponding ends of the handle members, and means carried by said ends for detachably connecting them with a wheel-hub when the nut enters the aperture in the holder-plate.

2. A nut-holding device comprising handle members lapped and pivoted together, a holder-plate having an angular aperture for receiving a spindle-nut, means for loosely mounting the end portions of the handle members upon the holder-plate, and means for detachably connecting said end portions with a band on the end of a wheel-hub.

3. A nut-holding device comprising handle members bent into S form and lapped and pivoted together where they are bent, jaws on the handles, a holder-plate having a central angular aperture therein and a corresponding marginal collar around said aperture, the aperture and collar being adapted for the reception of a spindle-nut, lateral and opposite flanges on the periphery of the holder-plate, pins on the ends of the jaws, passing loosely through the perforated flanges, and an expanding spring adapted for holding the pins engaged with the flanges.

In testimony whereof I have signed my name to this specification in the presence of two subscribing witnesses.

AUGUST SCHURR, Jr.

Witnesses:
 HERMAN H. HOFELDT,
 GEORGE OXFORD.